Aug. 6, 1957        P. SCHLUMBOHM        2,801,717
BUILDING WALLS

Filed Oct. 6, 1953        2 Sheets-Sheet 1

INVENTOR

Aug. 6, 1957

P. SCHLUMBOHM 2,801,717

BUILDING WALLS

Filed Oct. 6, 1953

INVENTOR

United States Patent Office 2,801,717
Patented Aug. 6, 1957

2,801,717

BUILDING WALLS

Peter Schlumbohm, New York, N. Y.

Application October 6, 1953, Serial No. 384,402

5 Claims. (Cl. 189—34)

The invention refers to a method and apparatus for building walls out of units by joining many units together. Being a chemist, I made this invention in analogy to building a molecule from combined atoms.

The "atom" in this case is a ring. Specifically, I use a ring such as has been developed for the bicycle industry. Such a bicycle rim has a U-channel cross section and the free edges of the U are crimped over for additional reinforcement.

Following the invention, connector pieces are created which allow for joining one such ring to another one. One connector allows for joining rings arranged in the same plane and I will refer to this connector-element as plane-connector. Another connector piece allows for connecting two rims arranged in two different planes at an angle to each other, especially at a right angle to each other. This connector-element I will call angle-connector.

The invention is described in Figure 1 to Figure 13 of the accompanying drawings.

Figure 1:
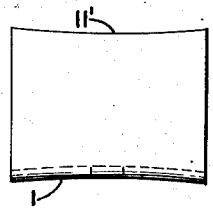
Figure 1 is a side view of the plane-connector.

The plane-connector and the angle-connector are preferably made from metal, preferably by stamping. The drawings Figure 1 to Figure 3 and Figure 7 to Figure 9 are construction drawings of such stamped connectors.

The plane-connector shown in Figure 1 to Figure 5 is characterized by a bottom wall 1 and two side walls 2 and 3 at a right angle from said bottom wall. The bottom wall 1 has a punched hole 4 to allow passage of a bolt 5 which is later on fastened by a nut 6. Part of the invention is to shape the connector to fit into the space between the walls of two neighboring rims in such a manner that there is substantially no leeway for movement of the two rims with reference to each other.

Figure 4:
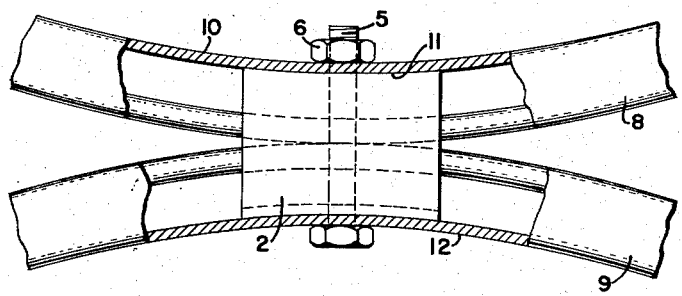
Figure 4 shows, partly in view, partly broken away, the connector inserted to hold together two rims.
Figure 6:
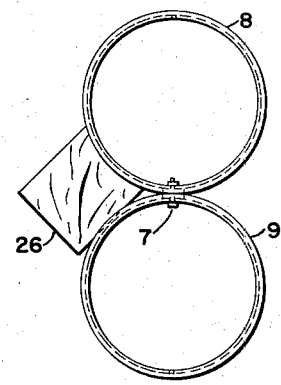
Figure 6 shows a view of two rims connected by the plane-connector.
Figure 5:
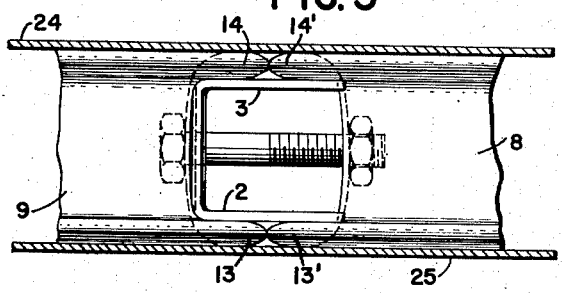
Figure 5 is substantially a side view of Figure 4.
Figure 7:
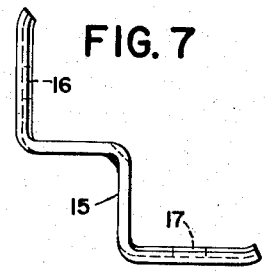
Figure 7 is a side view of the angle-connector.
Figure 8:
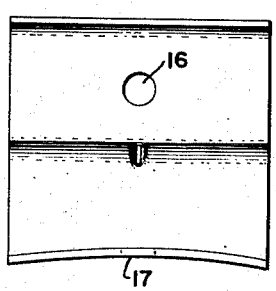
Figure 8 is a view of Figure 7 90° away.

Figure 4 and Figure 5 show in detail the contact zone 7 of two rims 8 and 9, illustrated in their entity in Figure 6. As can be seen clearly in Figure 4, the curved bottom wall 10 complements the curved edges 11 and 11' of the side walls 2 and 3 of the connector. Equally the curved bottom wall 12 of rim 9 complements the curved bottom wall 1 of the connector. Figure 4 illustrates the locking effect of this arrangement, preventing movement of rim 8 against rim 9 in the plane of the rims.

Figure 5 illustrates how the side walls 2 and 3 brace the side walls 13, 13' and 14, 14', respectively, of the two rims 8 and 9 to prevent any twisting movement of rim 8 with reference to rim 9. May I point out that while being of open U-shape the side walls 2 and 3 when locked, as shown in Figure 5, cannot move with respect to each other, due to the cooperating locking connection explained by Figure 4 with reference to the curved edges 11, 11', and the curved bottom wall 1. This explains the effect of the plane-connector.

Figure 9:
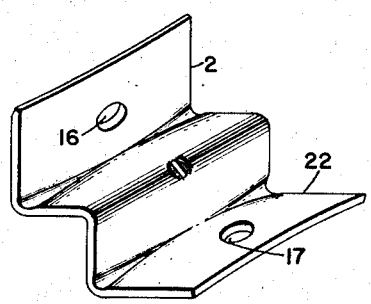
Figure 9 is a perspective view of the angle-connector.

Figure 7 to Figure 12 explain the locking connection of the angle-connector. This angle-connector 15 has the appearance as shown in Figure 9, with two holes 16, 17 provided for two bolts 18, 19. The connector has a cross section in the form of a W. One of the outside wings 20 of this W is curved to complement the curved bottom wall 21 of rim 8'. The other outer wing 22 is curved to complement the curved bottom wall 23 of rim 9'.

Figure 10:
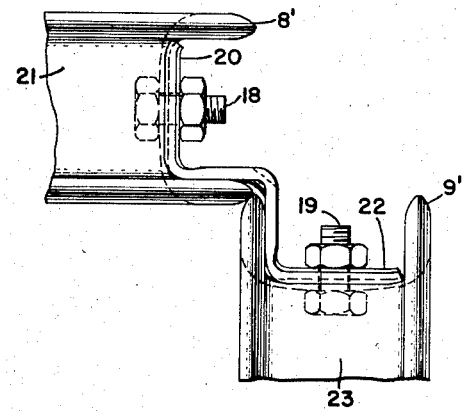
Figure 10 shows two rims connected by the angle-connector.

Figure 10 shows the connector bolted to the two rims 8', 9'.

Figure 11:
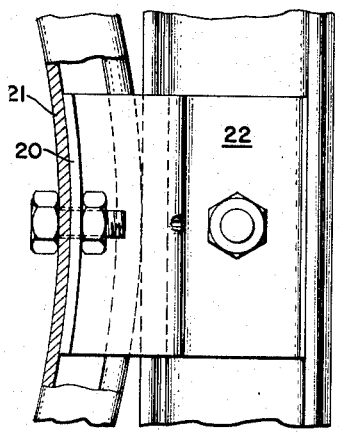
Figure 11 is a view of Figure 10 90° away, one rim being partly broken away.

Figure 11 shows the same arrangement seen from 90° away and by breaking away part of the side wall of one rim it becomes clear how exactly the curvature of the bottom wall 21 corresponds to the curvature of the wing 20 of the angle-connector.

Figure 12:
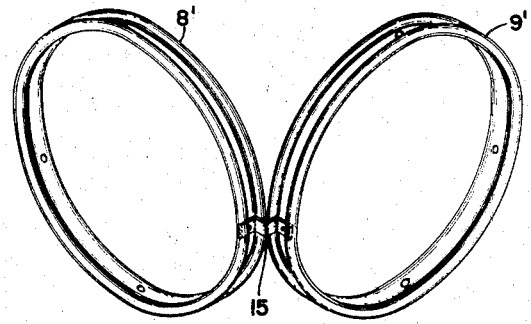
Figure 12 is a perspective view of two rims joined at right angles by one angle-connector.

Figure 12 shows the entity of rims 8', 9' locked at a right angle to each other by the angle-connector 15.

Figure 13:
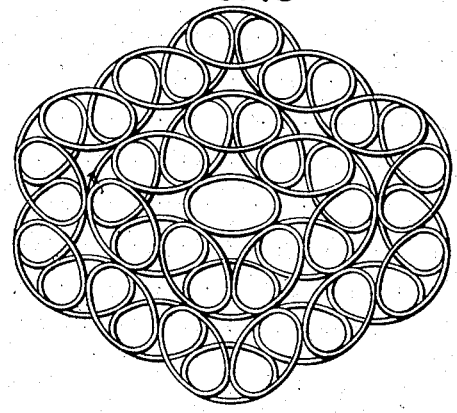
Figure 13 is a perspective view of a three-dimensional arrangement of rims joined either by plane-connectors or by angle-connectors, to wall a space on all sides.

Figure 13 gives an idea of the practically unlimited possibility of building walls and houses as molecules formed by these "atoms." The figure shows a rectangular body in which the four side walls are of a height corresponding to the arrangement of Figure 6, each side wall comprising six rings, whereas the top wall and the bottom wall comprise nine rings each.

The "molecule" wall structure may be covered on each side with the usual prefabricated type of sheet or shingle material. Fig. 5 shows in cross section wall plates 24, 25. The space between wall plates 24, 25 may be filled out with insulating material. To produce a wall to serve as a load carrying floor, the plates 24, 25 may be made out of metal and be spot-welded to the rim's side walls 13, 14 and 13', 14'. This will increase the rigidity of the entire wall structure by the combination of the tensile strength of the plates 24, 25 with the crush resistance of the U-channelled rims in a plane 90° away from the plane of the plates. Each component in this combination is strongest where the other component is weakest.

Figure 2:
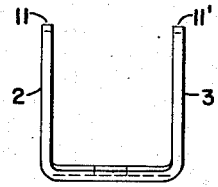
Figure 2 is a side view of Figure 1.
Figure 3:
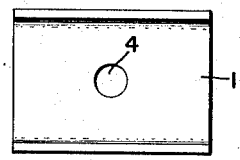
Figure 3 is a top view of Figure 2.

In constructing houses with such walls, the alignment of all rims at the periphery of the wall offers the great advantage to anchor a straight element, such as a U-channel metal bar—in analogy to the element shown in Fig. 2, but omitting the curved surface—by placing it into the U-rims, connecting them like a frame and serving as mounting base for doors, windows or foundations.

The new wall structure may be used to build table-tops, room-dividers, boxes, storage chambers, bodies for cars, trucks and railway cars. Using Duralumin, such a structure should be practical for building airplane wings and bodies.

However, I see the greatest application of this invention in wall structures, which a man can rig up himself, to build a summer cottage, or additional space for a garage.

Steel construction so far is limited to large houses and is handicapped by the necessity of contracting for hauling, erection and welding.

I manufacture, as a new product, the ring elements, plated against corrosion and punched with four ¼" holes in the bottom wall of the rim, 90° apart, and I manufacture as a new product the connector elements, of which two are shown in the drawings, punched with ¼" holes. The bolts and nuts are standard hardware.

With these new products of mine, a man can proceed as his spare time and his money will allow. He may haul them in his family car. If he moves, his investment is not lost. He can disassemble what he has built.

Aside from plates 24, 25 a nailable element, such as a square wood plate 26 of a thickness to fit into the U-rim can be inserted when assembling four ring elements, as shown in Fig. 6 with two rings assembled and the plate 26 inserted.

I claim as my invention:

1. Wall structure comprising a plurality of interlocked ring elements, each ring element being of channel-shaped cross section with out-turned side flanges connected by a transversely curved, outwardly concave bottom wall, a connector element locking two adjoining ring elements together, said connector element comprising a short, flanged piece of rigid material contacting the curved bottom walls of the ring elements to be locked together along its entire length, being snugly fitted between the out-turned flanges of each ring element and extending from the bottom wall of the one ring element to the bottom wall of the other ring element and means rigidly connecting the two ring elements to the connector element.

2. Wall structure as claimed in claim 1, in which the ring elements are disposed in the same plane and are tangent to each other.

3. Wall structure as claimed in claim 1, in which two ring elements are disposed in different planes and are tangent to each other.

4. Wall structure as claimed in claim 1, wherein the plurality of ring elements are arranged all in the same plane, adjoining ring elements being tangent to each other, and wherein the ring elements are faced on opposite surfaces with panel elements.

5. Wall structure as claimed in claim 1, wherein the ring elements are arranged all in the same plane, adjoining ring elements being tangent to each other, and wherein a nailable panel having a thickness equal to the space between the out-turned flanges is wedged between the out-turned flanges of four adjoining ring elements.

References Cited in the file of this patent

UNITED STATES PATENTS

| | | |
|---|---|---|
| D. 138,820 | Larson | Sept. 19, 1944 |
| 1,700,920 | Campbell | Feb. 5, 1929 |
| 2,053,135 | Dalton | Sept. 1, 1936 |

FOREIGN PATENTS

| | | |
|---|---|---|
| 758,286 | France | Oct. 23, 1933 |
| 769,067 | France | June 5, 1934 |
| 560,889 | Great Britain | Apr. 25, 1944 |